(12) United States Patent
Hara

(10) Patent No.: US 11,126,123 B2
(45) Date of Patent: Sep. 21, 2021

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Kenji Hara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/446,444

(22) Filed: Jun. 19, 2019

(65) Prior Publication Data

US 2020/0004186 A1 Jan. 2, 2020

(30) Foreign Application Priority Data

Jun. 28, 2018 (JP) .............................. JP2018-123693

(51) Int. Cl.
*G03G 15/00* (2006.01)

(52) U.S. Cl.
CPC ..... *G03G 15/5004* (2013.01); *G03G 15/5016* (2013.01); *G03G 15/5075* (2013.01); *G03G 2215/00109* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,880,110 B2 * | 4/2005 | Largman | ............ | G06F 11/1417 714/19 |
| 2002/0166084 A1 * | 11/2002 | Raynham | ............ | G06F 11/2294 714/37 |
| 2005/0050577 A1 * | 3/2005 | Westbrook | ......... | H04N 21/4516 725/134 |
| 2006/0036913 A1 * | 2/2006 | Krasnansky | ........ | G06F 11/1008 714/36 |
| 2006/0232891 A1 * | 10/2006 | Bushnik | ............. | G11B 33/1446 360/265.6 |
| 2006/0272017 A1 * | 11/2006 | Largman | ............. | G06F 11/1417 726/22 |
| 2008/0232840 A1 * | 9/2008 | Ebihara | ................. | G06F 3/1263 399/79 |
| 2009/0271581 A1 * | 10/2009 | Hinrichs, Jr. | ....... | G06F 11/1441 711/162 |
| 2011/0238886 A1 * | 9/2011 | Post | .................... | G06F 12/0246 711/103 |

(Continued)

FOREIGN PATENT DOCUMENTS

JP 5004831 B2 8/2012

*Primary Examiner* — Helen Zong

(74) *Attorney, Agent, or Firm* — Canon U.S.A., Inc. IP Division

(57) ABSTRACT

An image forming apparatus includes a storage and an access unit, the storage being managed by using a plurality of partitions, and the access unit is configured to access a file stored in a predetermined partition. The image forming apparatus includes: an execution unit configured to execute repair processing in which, out of data and management information for managing the data included in the file, the management information is repaired; and an error detecting unit configured to detect an access error that has occurred as a result of the access unit accessing the file. In response to detection of the access error by the error detecting unit, the execution unit executes the repair processing.

10 Claims, 8 Drawing Sheets

(56) References Cited

U.S. PATENT DOCUMENTS

| | | | |
|---|---|---|---|
| 2012/0063602 A1* | 3/2012 | Xi | G06F 11/1435 |
| | | | 380/286 |
| 2012/0159256 A1* | 6/2012 | Havewala | G06F 11/0793 |
| | | | 714/37 |
| 2013/0067191 A1* | 3/2013 | Mehra | G06F 3/0644 |
| | | | 711/173 |
| 2015/0073604 A1* | 3/2015 | Ro | B60H 1/00971 |
| | | | 700/276 |
| 2015/0143170 A1* | 5/2015 | Andrews | G06F 3/0673 |
| | | | 714/15 |
| 2016/0004586 A1* | 1/2016 | Bangole | G06F 11/0721 |
| | | | 714/15 |
| 2016/0059665 A1* | 3/2016 | Kim | B60H 1/00971 |
| | | | 165/11.1 |
| 2017/0064475 A1* | 3/2017 | Kingscott | G01R 31/3865 |
| 2019/0189080 A1* | 6/2019 | Choi | G09G 5/006 |
| 2019/0227919 A1* | 7/2019 | Nitta | G11C 29/70 |
| 2019/0268528 A1* | 8/2019 | Ina | H04N 1/00538 |
| 2019/0332573 A1* | 10/2019 | Hwang | H04N 21/21815 |
| 2020/0004185 A1* | 1/2020 | Hara | G03G 15/5016 |

* cited by examiner

FIG. 4A

| TARGET PARTITION <1-4> | GROUP <1-4> | ERROR NOTIFICATION OUTPUT <ON/OFF> | USAGE <NORM/TEMP> |
|---|---|---|---|
| PARTITION 1 | - | ON | TEMP |
| PARTITION 2 | - | ON | NORM |
| PARTITION 3 | 4 | OFF | NORM |
| PARTITION 4 | 3 | OFF | NORM |

FIG. 4B

| TARGET PARTITION <1-4> | REPAIR/ INITIALIZATION FLAG <ON/OFF> | RESERVATION TYPE <SIMPLE REPAIR/ FULL REPAIR/INITIALIZATION> |
|---|---|---|
| PARTITION 1 | ON | INITIALIZATION |
| PARTITION 2 | ON | FULL REPAIR |
| PARTITION 3 | ON | SIMPLE REPAIR |
| PARTITION 4 | ON | SIMPLE REPAIR |

FIG. 4C

| TARGET PARTITION <1-4> | REPAIR/ INITIALIZATION FLAG <ON/OFF> | RESERVATION TYPE <SIMPLE REPAIR/ FULL REPAIR/INITIALIZATION> |
|---|---|---|
| PARTITION 1 | OFF | |
| PARTITION 2 | ON | SIMPLE REPAIR |
| PARTITION 3 | ON | SIMPLE REPAIR |
| PARTITION 4 | ON | SIMPLE REPAIR |

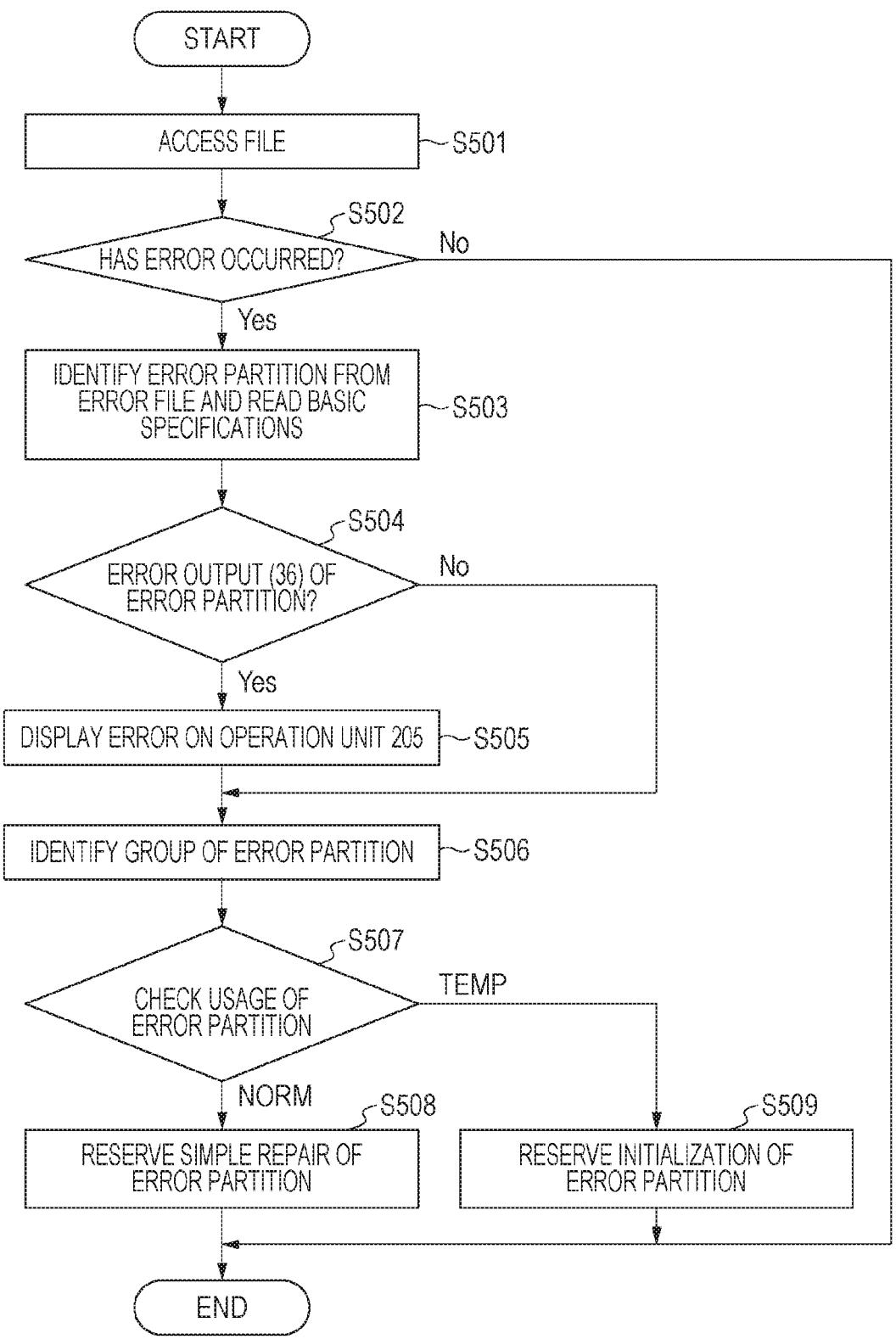

IMAGE FORMING APPARATUS, METHOD FOR CONTROLLING IMAGE FORMING APPARATUS, AND STORAGE MEDIUM

BACKGROUND

Field of the Disclosure

The present disclosure generally relates to image forming and, more particularly, to an image forming apparatus, a method for controlling the image forming apparatus, and a storage medium.

Description of the Related Art

An image forming apparatus that can implement a plurality of functions such as an image copying function (copy) and an image outputting function (print) has at least a storage device and a central processing unit (CPU). The storage device stores files (including data and management information (metadata) for managing the data) of image data and the like. The CPU executes a file system program for managing the files stored in the storage device to access the storage device.

In the related art, for example, if instantaneous interruption of a power supply or a malfunction of the storage device causes an error at the time of access for reading or writing data in the storage device, the image forming apparatus displays an error code and becomes unavailable.

For example, Japanese Patent No. 5004831 proposes an automatic initialization method. In Japanese Patent No. 5004831, a partition is set for each function of the image forming apparatus in a data area of the storage device. If a malfunction of the storage device is detected at the time of access for reading or writing data in the storage device, the occurrence of the malfunction is displayed for a user so that the user can select whether a partition including the address of the detected malfunction is to be formatted (initialized).

If the user selects initialization, the partition including the address of the malfunction is initialized. After the initialization, in a state where the power supply of the image forming apparatus is turned on, the CPU accesses the storage device again. If a malfunction is detected then, the partition is formatted for a predetermined number of times of retry. If the number of times of retry exceeds the predetermined number, the retry of formatting operation ends.

SUMMARY

The present disclosure provides an image forming apparatus including a storage and an access unit, the storage being managed by using a plurality of partitions, the access unit being configured to access a file stored in a predetermined partition. The image forming apparatus includes: an execution unit configured to execute repair processing in which, out of data and management information for managing the data included in the file, the management information is repaired; and an error detecting unit configured to detect an access error that has occurred as a result of the access unit accessing the file. In response to detection of the access error by the error detecting unit, the execution unit executes the repair processing.

Further features of the present disclosure will become apparent from the following description of exemplary embodiments with reference to the attached drawings.

BRIEF DESCRIPTION OF THE DRAWINGS

FIG. 4A illustrates basic specifications of partitions, and FIGS. 4B and 4C illustrate repair/initialization specifications of the partitions.

FIG. 5 is a flowchart of automatic reservation processing.

DESCRIPTION OF THE EMBODIMENTS

Various exemplary embodiments, features, and aspects of the present disclosure will be described in detail below with reference to the accompanying drawings.

First Embodiment

Figure 1:
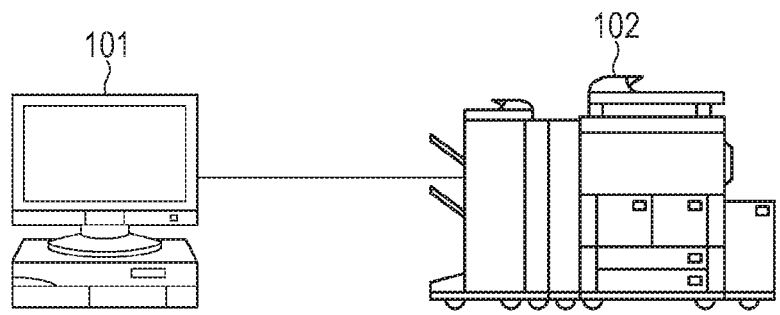
FIG. 1 illustrates an example of a system configuration of an image forming system.

FIG. 1 is a block diagram illustrating an example of a system configuration of an image forming system according to a first embodiment. The image forming system in FIG. 1 includes an image forming apparatus 102 and an information processing apparatus 101. The information processing apparatus 101 and the image forming apparatus 102 are connected to each other such that communication is possible. Although the information processing apparatus 101 and the image forming apparatus 102 are connected via a network in this embodiment, the information processing apparatus 101 and the image forming apparatus 102 may be connected via a parallel cable, a serial cable, a universal serial bus (USB) cable, or the like.

Figure 2:
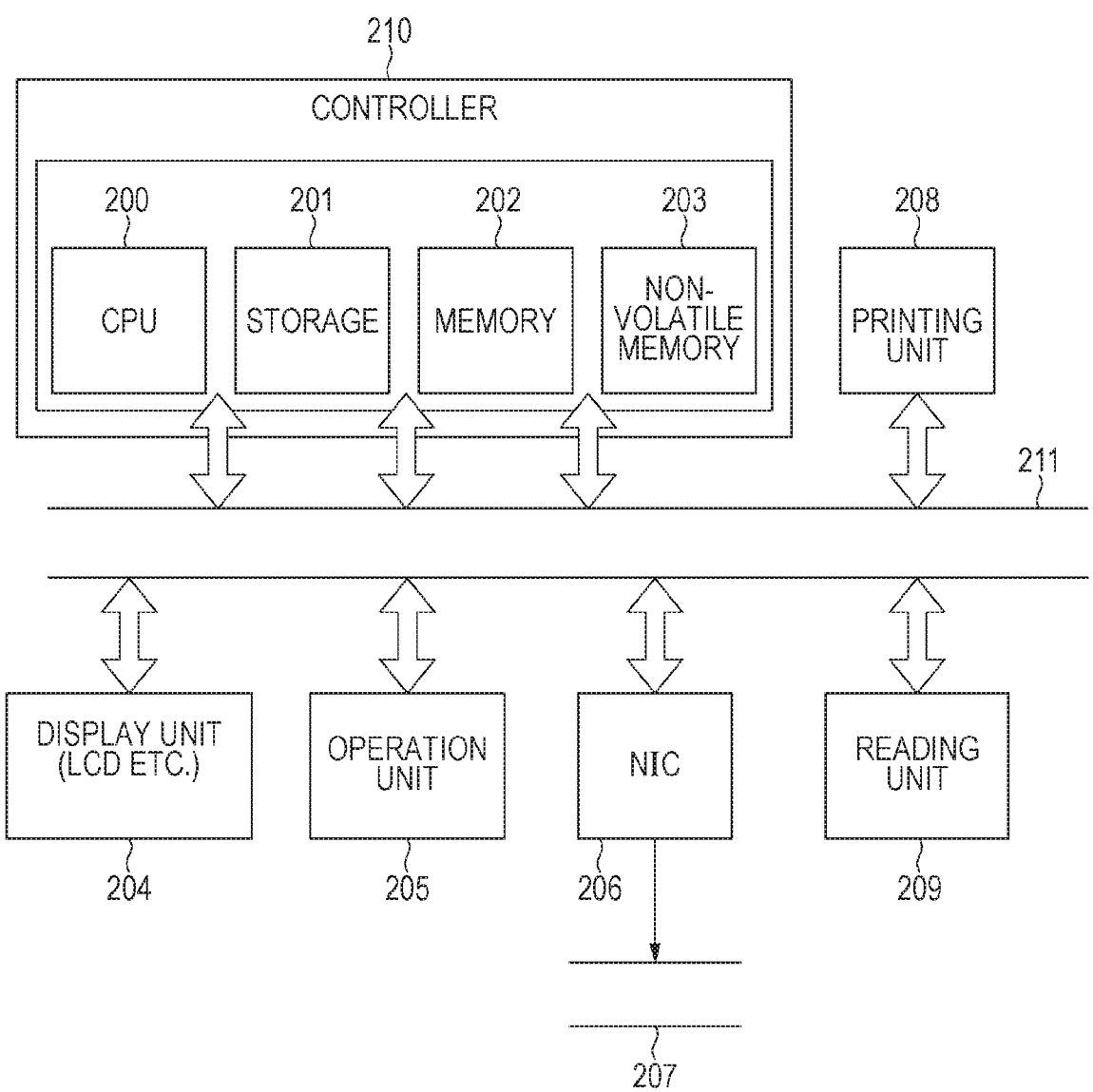
FIG. 2 illustrates an example of a hardware configuration of an image forming apparatus.

FIG. 2 illustrates an example of a hardware configuration of the image forming apparatus 102.

A central processing unit (CPU) 200, which may include one or more processors, one or more memories, circuitry, or a combination thereof, may control the image forming apparatus 102. A memory 202 serves as a main memory, a work area, and the like of the CPU 200.

A storage 201 is used as a storage area for storing an application program, font data, form data, and the like, for temporarily holding a print job, and for externally controlling the held job. In addition, the storage 201 is managed by using a plurality of partitions. Inside a partition, data and management information (metadata) are stored. The management data includes address information of the storage area of the data. The data and the corresponding management information will be herein described as a single file. Note that the management information will be described later in detail.

The storage 201 is, for example, a non-volatile memory such as a hard disk drive (HDD) or a solid state drive (SSD). The storage 201 is not limited to them, and may be any device (non-volatile device) that holds information in a state where a power switch is turned off.

A non-volatile memory 203 stores a program or the like that can work even in a case of a malfunction of the storage 201. For example, the non-volatile memory 203 stores a program for safe start mode for recovering the image forming apparatus 102, a control program of the image forming apparatus 102, a file system program (hereinafter referred to as file system) for managing a file stored in the storage 201, and the like. The non-volatile memory 203 is, for example, an SSD, an HDD, or the like, but may be any device (non-volatile device) that holds information in a state where a power switch is turned off.

The CPU 200, the storage 201, the memory 202, the non-volatile memory 203 serve as a controller 210. Specifically, programs stored in the storage 201 and the non-volatile memory 203 are loaded into the memory 202 and executed by the CPU 200.

A display unit 204 is formed of a liquid crystal display, for example, and displays various kinds of information (e.g., error message) to notify an operator.

An operation unit 205 is formed of a hard key and a power switch of the image forming apparatus 102, and receives inputs from the operator to the image forming apparatus 102.

Although the configuration in which the display unit 204 and the operation unit 205 are different members has been described herein, the configuration is not limited to this. For example, the display unit 204 may be a touch panel, and the operation unit 205 may include a soft key displayed on the touch panel. That is, the operation unit 205 may serve as both the soft key and a hard key (power switch).

A network interface card (NIC) 206 is used by the image forming apparatus 102 to mutually communicate data with another apparatus via a local area network (LAN) 207.

A printing unit 208 (printer) prints, on a sheet of paper, image data converted from page description language (PDL) data received from the information processing apparatus 101, image data generated by a reading unit 209, which will be described later, and the like. Note that the printing unit 208 is connected to the CPU 200 through a printing interface (I/F) (not shown). The printing unit 208 is controlled by the CPU 200 through the printing I/F.

The reading unit 209 (scanner) reads a document and generates monochrome binary image data or color multi-value image data. Note that the reading unit 209 is connected to the CPU 200 through a reading I/F (not shown). The CPU 200 controls an image signal that is input from the reading unit 209 through the reading I/F. The CPU 200 controls accesses between various devices via a main bus 211.

Figure 3:
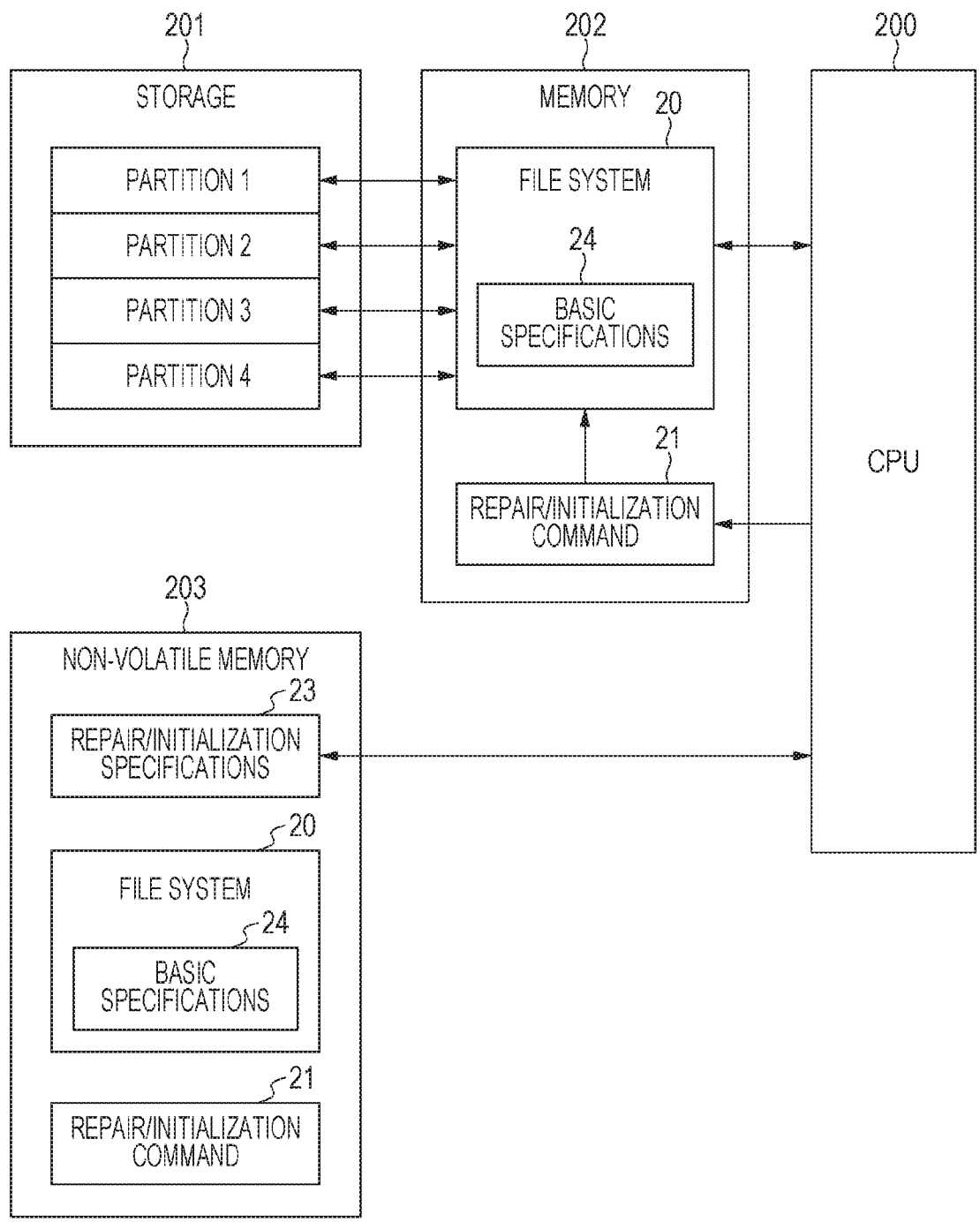
FIG. 3 illustrates a configuration of a controller and execution of a program.

FIG. 3 is a block diagram illustrating the configuration of the controller 210 and execution of a program in detail. The non-volatile memory 203 stores repair/initialization specifications 23, which will be described later with reference to FIG. 4B, a file system 20, and a repair/initialization command 21.

The memory 202 temporarily holds the file system 20 and the repair/initialization command 21 read from the non-volatile memory 203. The held file system 20 and repair/initialization command 21 can be executed by the CPU 200. The repair/initialization command 21 is a command that supports full repair, simple repair, and initialization, which will be described later.

The storage 201 stores image data or management information of a file. In order to provide a plurality of virtual storages by using a single storage, partitions are set in a storage area of the storage 201. For example, the storage 201 in FIG. 3 includes partitions 1 to 4.

Each of the partitions 1 to 4 is controlled by the CPU 200 executing the file system 20 that is read from the non-volatile memory 203 to the memory 202. Each of the partitions 1 to 4 becomes available by being initialized by the CPU 200.

The CPU 200 can read and write data from and to any partition. In this case, the CPU 200 causes management information to be stored in a partition. The management information is information used for managing a directory (folder) set in each partition when executing the file system or a file to be stored in the folder.

Data and management information associated with the data are stored as a single file in the same partition. Note that the management information is, for example, a file name, a file size, an address at which the data is stored in the storage 201, address information of a sector in which the data is stored in the storage 201, or the like. In particular, the address information is stored for each of a plurality of pieces of data that constitute a single file, and an address from an initial point to a terminal point of a sector, in which each of the plurality of pieces of data is stored, is stored.

When the CPU 200 executes the file system 20 and accesses a predetermined partition, the CPU 200 cannot normally read data from the storage 201 if (1) the management information mismatches, or if (2) the management information cannot normally be read. These access errors will be specifically described. Although the following description refers to a reading error that occurs during "Read" access, the access may be "Open" access, "Write" access, "Close" access, or the like.

(1) Access Error Caused by Mismatching of Management Information

In generation of a file, generated data is stored in a storage area from a predetermined address (initial symbol) to a predetermined address (terminal symbol). For example, the power supply is instantaneously interrupted before completion of the generation of a file. In such a case, data generation and storage operation is interrupted. That is, a file in which management information of the terminal symbol is not written may be generated. If such a file is read by the image forming apparatus 102, data may disappear in the middle of reading (terminal is absent). In such a case, the file system 20 transmits an error (return value indicating an error) to the CPU 200.

This results in an access error caused by damaged management information to be stored in the same partition as the partition of the file, not a physical malfunction of the storage area of the storage 201. The access error is the reading error during "Read" access and is a writing error during "Write" access.

This access error can be repaired by using the repair/initialization command 21 in response to an instruction from the CPU 200 to execute simple repair or full repair by using the file system 20 that will be described later.

(2) Access Error Caused by Malfunction of Storage Unit of Storage Device

The storage 201 is a block device. The storage 201 stores fixed length data (sector) that has been written by the CPU 200 with a cyclic redundancy check (CRC) added thereto. In response to a "Read" request, retry is repeatedly performed until the CRC matches.

At this time, the data holding ability of the storage 201 decreases. Alternatively, if the CRC mismatches by an instantaneous interruption of the power supply or the like for more than a predetermined number of times of retry, data cannot be read from the storage 201. Such an access error may be repaired by writing the data again to the same storage area.

Thus, the access error can be repaired by executing full repair of the file system 20, which will be described later, by using the repair/initialization command 21 in response to an instruction from the CPU 200.

Next, the repair/initialization command 21 will be described in detail. Note that this command is also a reservation type 40 illustrated in FIG. 4B, which will be described later.

The command may be an initialization command that is an instruction for initialization processing, a full-repair command that is an instruction for full-repair processing, or a simple-repair command that is an instruction for simple-repair processing. Although the full-repair processing may often be followed by the simple-repair processing, the terms "full" and "simple" are used herein in order to explicitly indicate the corresponding repair processing. Algorithms for the above-described repair processing and initialization processing are typically common algorithms, and therefore these algorithms are not described herein.

Each of the commands will be described. The content of processing for each of the commands differs depending on the file system and does not limit the processing according to the embodiment of the present disclosure.

First, "initialization" will be described.

The initialization processing is repair processing in which all the files recorded in a partition for which the initialization processing is set are deleted. For example, the initialization processing is repair processing in which the management information of a file in the partition is deleted so that the file cannot be referred to. Note that the initialization processing is executed by two methods: a method in which only the management information is deleted; and a method in which the management information and all the data stored in a sector that constitutes the partition are deleted. Although the method in which only the management information is deleted, which is advantageous in terms of speed, is employed in this embodiment, the method is not limited to this.

Next, "simple repair" will be described.

The simple-repair processing is processing in which the management information included in a file recorded in a partition for which the simple-repair processing is set is repaired.

In the simple-repair processing, it is checked whether data and management information included in the same file match. For example, the simple-repair processing reads the address indicating a sector in which each piece of data that constitutes the file stored in a predetermined partition from the initial point and checks whether the terminal point of the address that is successfully read is closed with a terminal symbol.

If the terminal point of the address that is successfully read is not closed with a terminal symbol, it is determined that the management information is abnormal. In this case, processing is executed to close, with the terminal symbol, the terminal of the address in which the data is normally stored (a data group from the initial end to the terminal of the data that is normally stored is set as a single file).

If a directory is found, recursive processing is executed in the directory, and it is checked whether the management information is normal in all the directories and all the files. Thus, the simple-repair processing takes time substantially in proportion to the number of stored files.

Note that the simple-repair processing is repair processing that ends in a shorter time than the full-repair processing. This is because, as will be described later, the simple-repair processing checks whether the management information is normal whereas the full-repair processing reads all the sectors and checks whether the data and management information in all the sectors are correct.

Lastly, "full repair" will be described.

The full-repair processing is processing in which the management information of a file recorded in a partition for which the full-repair processing is set is repaired.

In the full-repair processing, for example, prior to the above simple-repair processing, data is read from all the sectors that constitute a partition, and it is checked whether the data can be read. If an unreadable sector (defective sector) is found, the defective sector is separated, or a file including the defective sector is separated, for example, so that the defective part is not accessed in the future.

For example, if the management information is abnormal, the terminal of the address at which the data is normally stored is closed with a terminal symbol (a data group from the initial end to the terminal of the data that is normally stored is set as a single file). Alternatively, the file is separated. Note that the management information may be repaired after the defective sector has been repaired.

The following commands are used for these three kinds of processing according to operating system (OS).

For Windows, the following definition can be made for example.

Initialization: Format

Simple Repair: Scan Disk (only "automatic repair of file system error" is valid in the setting)

Full Repair: Scan Disk (only "automatic repair of file system error" and "scan and repair defective sector" are valid in the setting)

For Linux (registered trademark), the following definition can be made for example.

Initialization: mkfs

Simple Repair: fsck (specify "option for obviously making processing time shorter")

Full Repair: Conduct Inspection by using badblocks, fsck (specify "option for obviously making processing time longer")

Next, with reference to FIG. 4A, basic specifications (statuses) of the partitions of the storage 201 will be described. The specifications illustrated in FIG. 4A are stored in the non-volatile memory 203 together with the file system 20, and are read and held in the memory 202.

A row 25 indicates the basic specifications of the partition 1. A row 26 indicates the basic specifications of the partition 2. A row 27 indicates the basic specifications of the partition 3. A row 28 indicates the basic specifications of the partition 4.

A target partition 34 is an index for indicating which of the partitions the basic specifications are.

A group 35 indicates an associated partition (grouped partition). The partitions having a relationship can be subjected to the initialization processing or the repair processing in units of group. For example, the partition 3 and the partition 4 are grouped together in FIG. 4A. Thus, when the partition 3 is initialized, the partition 4 is also initialized.

Note that the partition 1 is not grouped with any other partition in FIG. 4A. Thus, for example, even if the partition 1 is subjected to the initialization processing, the other partitions are not initialized. The same applies to the partition 2.

An error notification output 36 indicates whether an error notification (access error notification) is to be output. If the error notification is set to "ON", the error notification is output; if the error notification is set to "OFF", the error notification is not output. Note that the error notification output 36 can be set for each partition.

A usage 37 indicates the usage of the partitions. In FIG. 4A, "NORM" indicates normal usage, and "TEMP" indicates temporary usage.

"TEMP" indicates using a partition for storing a temporary file. The temporary file is a file that does not have to be permanently left and is to be deleted when temporal use thereof ends, such as a file to be used for electronic sorting. A partition area for storing the temporary file is referred to as a temporary partition. Since the temporary partition stores only the temporary file, the file does not have to be left in the partition regardless of turning off and turning on of the power supply. Thus, if some files are left at the time of the start, all these files may be deleted (this processing corresponds to the initialization processing).

"NORM" indicates using a partition for storing data. If a file is created, the file is present and can be referred to even if the power supply is turned off or turned on.

Next, with reference to FIG. 4B, the repair/initialization specifications 23 (data structure for reserving repair) of the partitions of the storage 201 will be described.

The specifications illustrated in FIG. 4B are stored in the non-volatile memory 203. Thus, as long as the CPU 200 is operable, repair processing based on the repair/initialization specifications 23 of each partition stored in the memory 202 can be executed. For example, even if an access error of the storage 201 has occurred and the image forming apparatus 102 becomes inoperable and is rebooted, the CPU 200 can execute the repair processing based on the repair/initialization specifications 23 stored in the memory 202.

A row 30 indicates the repair/initialization specifications of the partition 1. A row 31 indicates the repair/initialization specifications of the partition 2. A row 32 indicates the repair/initialization specifications of the partition 3. A row 33 indicates the repair/initialization specifications of the partition 4.

A target partition 38 is an index for indicating which of the partitions the repair/initialization specifications are. The index indicates that a storage area for reserving repair is secured for each partition.

A repair/initialization flag 39 indicates whether the repair processing or the initialization processing is to be executed. If the flag is set to "OFF", the repair processing or the initialization processing is not reserved (the flag is absent). If the flag is set to "ON", the repair processing or the initialization processing is reserved. The reservation herein means processing to be executed at the time of reboot.

The reservation type 40 is reservation setting as to which type of processing among initialization, full repair, and simple repair, is to be executed for each partition.

By setting the reservation type 40 and by setting the repair/initialization flag 39 to "ON", the reservation of the repair processing or the initialization processing is set. When the apparatus is started and the repair processing or the initialization processing is completed, the repair/initialization flag 39 is set to "OFF". Thus, the flag can be kept being "ON" (reserved state can be kept) until the repair processing or the initialization processing is certainly completed.

Next, FIG. 5 illustrates a flowchart of automatic reservation processing. In the automatic reservation processing, the repair processing or the initialization processing of a partition including an error file is automatically reserved after the CPU 200 has accessed a file and has detected an error. Note that the reservation is, as described above, reservation for executing the repair processing or the initialization processing at the time of reboot of the image forming apparatus 102. In FIG. 5, reservation processing according to this embodiment of the present disclosure executed if an error is detected when a file stored in the partition 3 in FIG. 4B is accessed will be described as a specific example.

The flow starts when the CPU 200 executes the file system 20.

In step S501, the CPU 200 executes the file system 20 to access a file. Specifically, the CPU 200 executes the file system 20 to open, read, write, or close the file, for example. Upon completion of step S501, the process proceeds to step S502.

In step S502, it is checked whether an access error has occurred (an error is detected). Specifically, in step S502, in accordance with an instruction of the CPU 200, the file system 20 executes the content of the instruction for the storage. The CPU 200 receives, from the file system 20, a return value indicating whether the execution has been normally completed. On the basis of the return value as a response, the CPU 200 determines whether an access error has occurred. For example, the CPU 200 receives a return value of −1 if an error has occurred, and receives a return value of 0 if no error has occurred.

If no access error has occurred in step S502, the reservation processing ends. If an access error has occurred in step S502, the process proceeds to step S503.

In step S503, the CPU 200 acquires, from the file system 20 that has been executed, the partition number among the partitions 1 to 4, from which reading of a stored file has failed. On the basis of the acquired information, the CPU 200 identifies the partition in which the access error has occurred. Then, by using the basic specifications of the partitions illustrated in FIG. 4A, the basic specifications of the partition in which the access error has occurred are acquired, and the following flow proceeds in accordance with the specifications.

For example, if the partition in which the access error has occurred is the partition 3, information in the row 27 in FIG. 4A is acquired, and the basic specifications thereof are referred to. Upon completion of step S503, the process proceeds to step S504.

In step S504, in the basic specifications of the partition acquired in step S503, in which the access error has occurred, it is checked whether the error notification output 36 is set to "ON" or "OFF", and it is determined whether an error notification (error notification screen) is to be displayed on the display unit 204.

As described above, if the error notification output 36 is set to "OFF", the error notification is not displayed, and the step S505 is skipped to step S506. If the error notification output 36 is set to "ON", the process proceeds to step S505. For example, in the row 27, since the error notification output 36 is set to "ON", the process proceeds to step S505. Note that the error notification herein is a notification of an error code. The image forming apparatus 102 becomes unavailable upon notification of the error code.

In step S505, the error notification is displayed on the display unit 204. Upon completion of step S505, the process proceeds to step S506.

In step S506, in order to check the relationship between the partitions, the setting of the group 35 is checked in the basic specifications of the partition acquired in step S503, in which the access error has occurred. For example, the row 27 indicates that the partition 3 has a group relationship with the partition 4.

In step S507, the usage 37 is checked in the basic specifications of the partition acquired in step S503, in which the access error has occurred. If the usage 37 is "NORM", the process proceeds to step S508.

In step S508, simple-repair processing is set as the reservation type 40 of the partition in which the access error has occurred. In this embodiment, until the reservation is set in step S508, the repair/initialization flag 39 is set to "OFF", and the reservation type 40 is empty. Upon setting of the reservation, the repair/initialization flag 39 is set to "ON", and simple repair is reserved as the reservation type 40. For example, in the row 27, simple repair is set for the partition 3. Furthermore, since the partition 3 has a group relationship with the partition 4, simple repair is also set for the partition 4.

Upon completion of step S508, the flowchart of reservation processing ends.

Referring back to step S507, if the usage 37 is "TEMP" in step S507, the process proceeds to step S509.

In step S509, initialization processing is set as the reservation type 40 of the partition in which the access error has occurred. For example, if the partition in which the access error has occurred is the partition 1, initialization is set. Upon completion of the setting in step S509, the flowchart of reservation processing ends. Upon completion of the flowchart of reservation processing, the power supply of the image forming apparatus 102 is turned off. Alternatively, information for prompting an operator to turn off the power supply of the image forming apparatus 102 is displayed on the display unit 204. If turning off of the power supply is selected, the CPU 200 controls the power supply of the image forming apparatus 102 and turns off the power supply.

After the flowchart of reservation processing has ended, if the power supply of the image forming apparatus 102 is turned on again, the partition is repaired in accordance with the set reservation type. This process will be specifically described later with reference to FIG. 7.

Note that a configuration in which simple repair is set as the reservation type 40 in step S508 has been described in this embodiment. This is for increasing usability by shortening the time for repair processing at the time of reboot of the image forming apparatus 102 compared with a case where full repair is set. However, for example, the operator may select in step S508 the full repair or the simple repair as the reservation type 40 to be set, or the full repair may be set as the reservation type 40 in step S508.

In addition, even if it is determined in step S504 that the error notification is not to be output, the repair processing or the initialization processing can be set as the reservation type for the partition. Furthermore, if the error notification is not to be output in step S504, the image forming apparatus 102 becomes available. Thus, for example, it becomes possible to access a file that is different from the file that has been accessed in step S501. Specifically, another job can be executed.

By making reservation as in the configuration according to this embodiment, as will be described later with reference to FIG. 7, it is possible to execute the repair processing at the time of the next start of the image forming apparatus 102. In the configuration in which the repair processing is executed at the time of the next start, the repair processing can be executed in a state where the printing unit 208 or the reading unit 209 is not operated. Since the image forming apparatus 102 does not receive, for example, a print job during the repair processing, a failure of print processing regardless of transmission of the print job from an operator is prevented.

Figure 6:
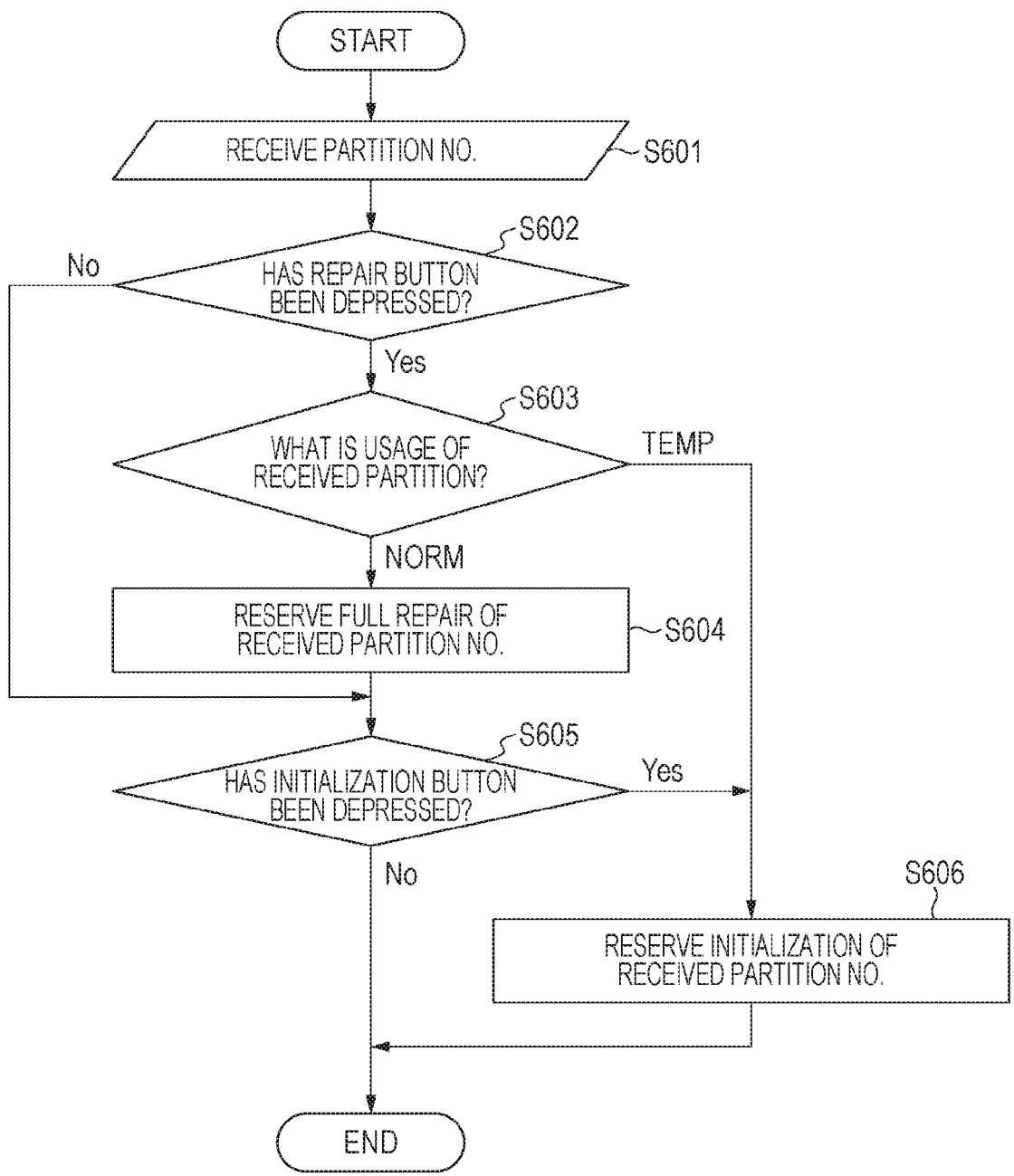
FIG. 6 is a flowchart of manual reservation processing.

Next, FIG. 6 illustrates a flowchart of manual reservation processing in a case where an operator manually sets the repair processing or the initialization processing through the operation unit 205.

The operator of the image forming apparatus 102 operates a screen (not shown) for repairing the storage on the operation unit 205, and thereby the CPU 200 detects the operation, and the flowchart of manual reservation processing in FIG. 6 starts.

In step S601, the CPU 200 reserves selection of a partition number from the operator. In the example described herein, a partition number of 2 is received.

If a repair button (not shown) on the operation unit 205 has not been depressed by the operator in step S602, the process proceeds to step S605. If the repair button has been depressed, the process proceeds to step S603.

In step S603, the usage 37 of the received partition is acquired from basic specifications 24 in FIG. 4A. If the usage 37 is "TEMP", the process proceeds to step S606. If the usage 37 is "NORM", the process proceeds to step S604. For example, in a case of the partition 2, since the usage 37 thereof is "NORM", the process proceeds to step S604.

In step S604, the repair/initialization flag 39 of the reserved partition is set to "ON", and full repair is set as the reservation type 40 thereof. For example, the row 31 of the partition 2 illustrated in FIG. 4B is set. Upon completion of step S604, the process proceeds to step S605. As determined in step S602, since the depressed button is not the initialization button, the flowchart of manual reservation processing ends.

Referring back to step S603, if the usage 37 of the received partition is "TEMP" in step S603, the process proceeds to step S606. This is a case where the received partition is, for example, the partition 1 in FIG. 4A.

In step S606, the repair/initialization flag 39 of the received partition is set to "ON" from "OFF", and initialization is set as the reservation type 40. Upon completion of step S606, the flowchart of manual reservation processing ends. Note that, as described above, the usage 37 being "TEMP" indicates that a temporary file is stored in the partition. Thus, the file does not have to be held when the image forming apparatus 102 is started next time. With such a configuration, the processing of the partition for "TEMP" usage can end in a shorter time than the repair processing executed by reconstructing the partition.

Referring back to step S602, if the repair button has not been depressed in step S602, the process proceeds to step S605. If the initialization button has not been depressed in step S605, the flowchart of reservation processing ends without setting the reservation type 40. If the initialization button has been depressed, the process proceeds to step S606, and initialization is set as the reservation type 40 for the received partition. Upon completion of step S606, the flow of reservation setting processing ends.

Note that, for example, in automatic reservation processing in a case where an access error has occurred as illustrated in FIG. 5, simple repair, which takes a shorter processing time, is set as the reservation type 40 in step S508. In contrast, in manual reservation processing in which simple/full repair processing can be set in accordance with the operator's convenience, full-repair processing, which takes a longer processing time, is set as the reservation type 40. Either one of the simple-repair processing and the full-repair processing can be selectively used in the above manner. In this manner, usability can be increased by setting long-time repair processing as desired by the operator and by setting short-time repair processing automatically.

Figure 7:
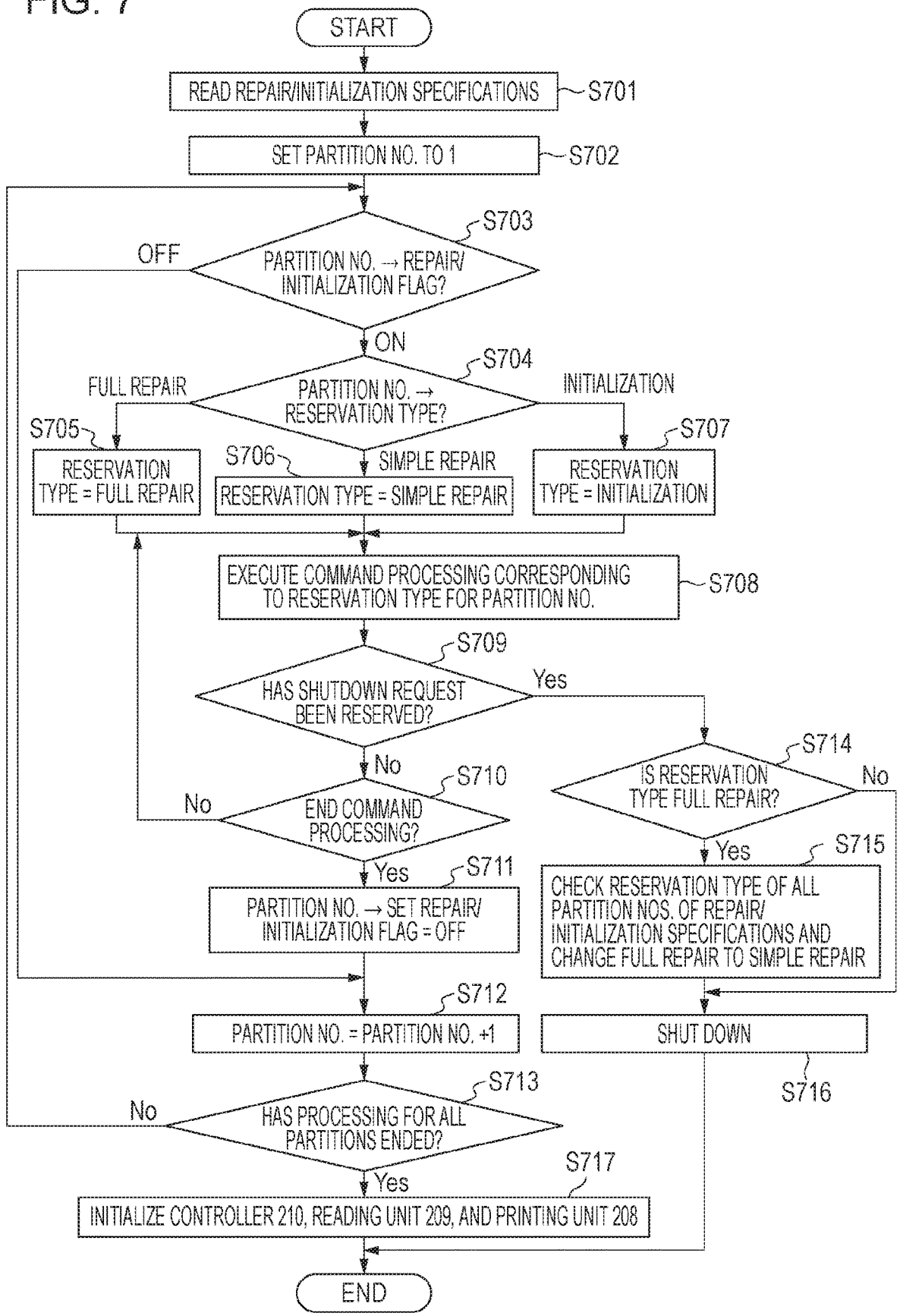
FIG. 7 is a flowchart of repair processing/initialization processing executed at the start of the image forming apparatus.

Next, FIG. 7 illustrates a flowchart of repair processing/initialization processing executed by the CPU 200 at the time of the start of the image forming apparatus 102.

The flowchart in FIG. 7 starts when the image forming apparatus 102 is started. Note that step S701 to step S716 are a process flow of the repair processing or the initialization processing executed by the CPU 200 executing the file system 20. The controller 210, the reading unit 209, and the printing unit 208 are initialized in step S717 to normally start the image forming apparatus 102, and the image forming apparatus 102 becomes available. That is, the file system 20 is repaired prior to the start of the image forming apparatus 102.

In step S701, the CPU 200 acquires the repair/initialization specifications 23 illustrated in FIG. 4B. Upon completion of step S701, the process proceeds to step S702. In step S702, the CPU 200 sets the partition No. to 1. Then, in step S703, the CPU 200 refers to the repair/initialization flag 39 corresponding to the partition No. If the repair/initialization flag 39 is set to "OFF", the process proceeds to step S712. If the repair/initialization flag 39 is set to "ON", the process proceeds to step S704.

In step S704, the reservation type 40 corresponding to the partition No. is referred to. If the reservation type 40 is "full repair", the process proceeds to step S705, and full repair is set as the type of the repair processing/initialization processing executed by the CPU 200 by using the file system 20. Upon completion of step S705, the process proceeds to step S708.

Similarly, if the reservation type 40 is "simple repair" in step S704, the process proceeds to step S706, and simple repair is set as the type of the repair processing/initialization processing executed by the CPU 200 by using the file system 20. Upon completion of step S706, the process proceeds to step S708.

Similarly, if the reservation type 40 is "initialization" in step S704, the process proceeds to step S707, and initialization is set as the type of the repair processing/initialization processing executed by the CPU 200 by using the file system 20. Upon completion of step S707, the process proceeds to step S708.

In step S708, on the basis of the type of the repair processing/initialization processing that has been set in step S705, step S706, or step S707, the CPU 200 causes the file system 20 to start the repair processing or the initialization processing.

In step S709, from the start of the repair processing or the initialization processing in step S708 until the end of the repair processing or the initialization processing in step S710, the CPU 200 monitors if a shutdown request is received. If a shutdown request is not received in step S709 and the repair processing or the initialization processing ends in step S710, the process proceeds to step S711. Note that the shutdown request is received from the operator.

In step S711, the repair/initialization flag 39 in FIG. 4B corresponding to the partition No. is changed to "OFF" from "ON". In addition, the setting of the reservation type is canceled. The repair/initialization specifications 23 in FIG. 4B stored in the non-volatile memory 203 are overwritten with these changes. Thus, the repair processing or the initialization processing is not executed for this partition when the image forming apparatus 102 is started next time.

Upon completion of step S711, the process proceeds to step S712, and 1 is added to the partition No. For example, if the corresponding partition No. is 1, the partition No. is set to 2. Upon completion of step S712, the process proceeds to step S713.

If the partition No. that is set in step S712 is included in the target partition 34 of the basic specifications in FIG. 4A in step S713, the process returns to step S703. If the partition No. is not included (the repair/initialization flag 39 for all the partitions has been checked), the process proceeds to step S717.

In step S717, the controller 210, the reading unit 209, and the printing unit 208 are initialized. Upon completion of step S717, the flowchart of the repair processing/initialization processing at the time of the start of the image forming apparatus 102 ends. Then, the image forming apparatus 102 becomes available.

Referring back to step S709, if the CPU 200 receives the shutdown request in step S709, the process proceeds to step S714. Note that upon reception of the shutdown request, the repair processing or the initialization processing that has been started in step S708 is stopped.

In step S714, it is determined whether the repair processing or the initialization processing that has been started in step S708 is full-repair processing. If the processing is not full-repair processing, the process proceeds to step S716. Note that the repair processing or the initialization processing has not been finished yet in step S714, and thus, the repair/initialization flag 39 of the repair/initialization specifications 23 remains "ON".

In step S716, the CPU 200 shuts down the image forming apparatus 102. Then, the flowchart of the repair processing/initialization processing at the time of the start of the image forming apparatus 102 ends.

Note that, as described above, the repair processing or the initialization processing has not been finished yet in step S714, and thus, the repair/initialization flag 39 of the repair/initialization specifications 23 remains "ON". Furthermore, the reservation type 40 is not changed from the repair processing or the initialization processing that has been started in step S708.

Thus, in a case where the image forming apparatus 102 is started again, the repair processing or the initialization processing that has been stopped is executed again. For example, if the shutdown request is received during the initialization processing of the partition 1 (the row 30) in FIG. 4B, the repair/initialization specifications remain as illustrated in the row 30 when the image forming apparatus 102 is started again.

Referring back to step S714, if the repair processing or the initialization processing that has been started in step S708 is full-repair processing in step S714, the process proceeds to step S715. This is a case where, for example, the flowchart of the repair processing/initialization processing of the partition 2 illustrated in the row 31 in FIG. 4B is executed.

In step S715, the reservation type is checked for not only the partition for which the shutdown request is received during the repair processing, but also all the partitions for which the reservation type is set in the repair/initialization specifications 23.

If there is a partition for which full repair, which takes a long time, is set as the reservation type 40 of each partition, the reservation type 40 is overwritten (set) to simple repair, which does not take a long time. In this case, the repair/initialization flag 39 is not changed. For example, if the reservation type 40 of the partition 3 illustrated in FIG. 4B is full repair, the reservation type 40 of the partition 2 is changed from full repair to simple repair, and then, the reservation type 40 of the partition 3 is also changed from full repair to simple repair.

Note that the configuration in which the reservation type 40 of all the partitions is checked has been described in this embodiment, the present disclosure is not limited to this. The reservation type 40 of only the partition for which the shutdown request has been received during processing may be checked. However, by checking and overwriting the reservation type 40 of all the partitions, the speed for repair processing can be increased when the image forming apparatus 102 is started again.

FIG. 4C illustrates repair/initialization specifications 50 after change. The repair/initialization specifications 23 before change are overwritten to the repair/initialization specifications 50. Upon completion of step S715, the process proceeds to step S716, and the CPU 200 shuts down the image forming apparatus 102. Then, the flowchart of the repair processing/initialization processing at the time of the start of the image forming apparatus 102 ends.

Note that, as described above, the repair/initialization specifications 23 are overwritten to the repair/initialization specifications 50 in step S715. Thus, if the image forming apparatus 102 is started again, the repair/initialization specifications to be read in step S701 are not the repair/initialization specifications 23 but the repair/initialization specifications 50.

The configuration according to this embodiment can provide an image forming apparatus that can automatically repair the storage even if a reading error has occurred, and the operator does not have to call a serviceman.

In addition, even if the image forming apparatus is shut down in response to the shutdown request while full-repair processing, which takes a long time, is being executed, when the power supply is turned on, it is possible to not execute full-repair processing, which takes a long time, but to execute simple-repair processing, which takes a shorter time than full-repair processing. Thus, the image forming apparatus can become available immediately when the operator wishes to use it as soon as possible.

Second Embodiment

Figure 8:
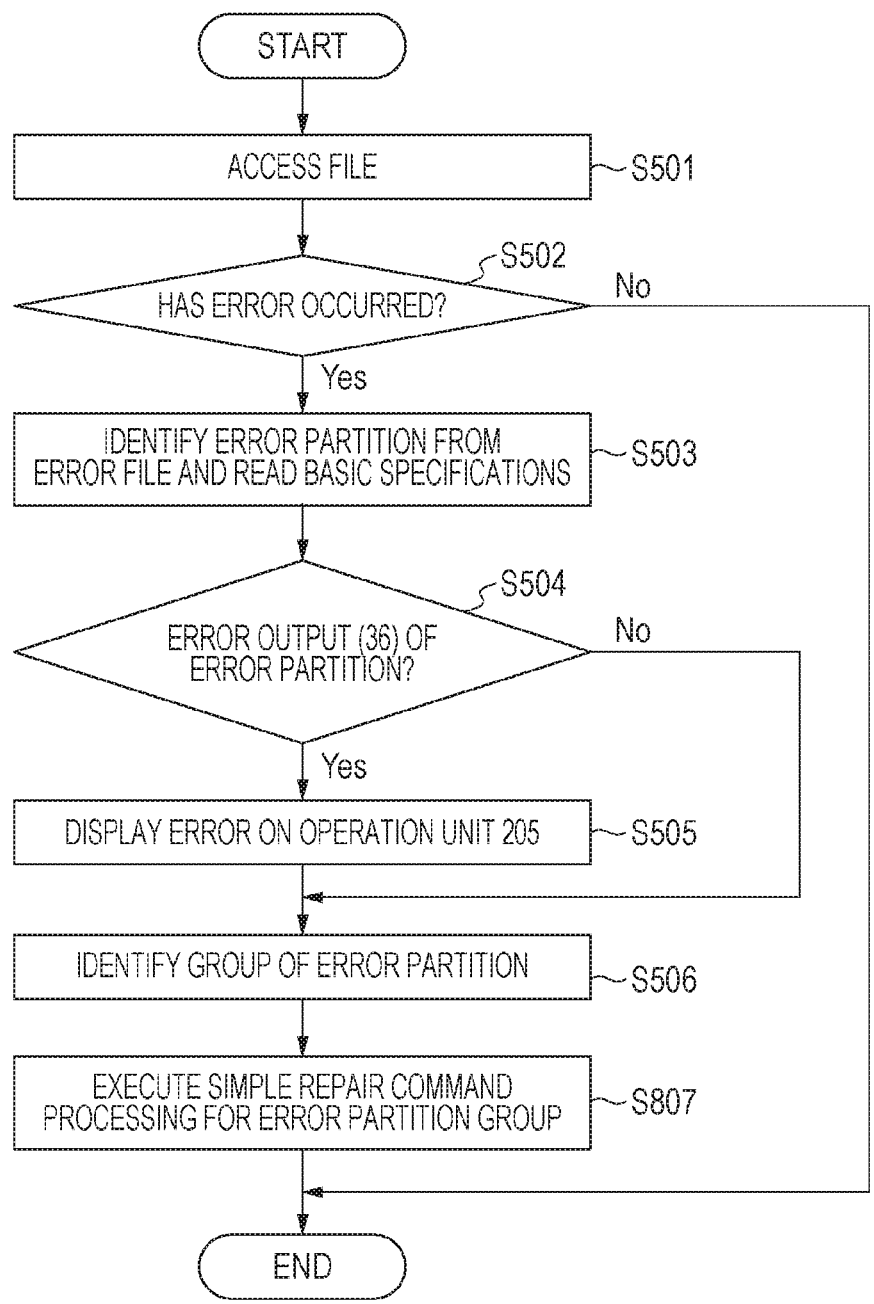
FIG. 8 is a flowchart of automatic repair processing.

An image forming apparatus according to a second embodiment will be described with reference to FIG. 8. FIG. 8 illustrates a flowchart of automatic repair processing in which repair processing is automatically executed for a partition including a file in which an error has been detected by the CPU 200 executing a file system. FIGS. 1 to 4 are common in the first and second embodiments, and thus, a detailed description thereof will be omitted.

In this embodiment, repair and automatic repair are performed at timings different from those in the first embodiment. In the first embodiment, upon detection of an access error, reservation of repair processing/initialization processing is set. In contrast, in this embodiment, upon detection of an access error, repair processing is executed.

If the CPU 200 detects an access error, the flowchart of automatic repair processing in FIG. 8 is performed. Note that steps that are the same as steps S501 to S506 in FIG. 5 are denoted by the same reference numerals, and a detailed description thereof will be omitted.

As described above, in step S506, the CPU 200 checks the setting of the group 35. For example, the row 27 indicates that the partition 3 has a group relationship with the partition 4. Upon completion of step S506, the process proceeds to step S807.

In step S807, the CPU 200 executes "simple repair" as the repair processing for the partition in which the access error has occurred or a group that is associated with the partition in which the access error has occurred. Upon completion of step S807, the flowchart of automatic repair processing ends. Then, the image forming apparatus 102 becomes available.

Note that this embodiment has illustrated a configuration in which simple repair is automatically executed in step S807. This is for increasing usability by shortening the time for repair processing compared with a case where full repair is automatically executed. However, for example, the operator may select the full repair or the simple repair to be processed in step S807.

In addition, even if it is determined in step S504 that the error notification is not to be output, simple-repair processing can be executed for a partition. Furthermore, if the error notification is not to be output in step S504, the image forming apparatus 102 becomes available. Thus, for example, it becomes possible to access a file that is different from the file that has been accessed in step S501. Specifically, another job can be executed.

The configuration according to this embodiment can provide an image forming apparatus that can automatically repair the storage even if a reading error has occurred, and the operator does not have to call a serviceman.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Various examples and embodiments of the present disclosure have been described above. However, the spirit and scope of the present disclosure are not limited to specific descriptions in this specification.

Embodiments of the present disclosure can also be realized by supplying a program realizing one or more functions of the above embodiments to a system or an apparatus through a network or a storage medium and reading and executing the program by using one or more processors in a computer of the system or apparatus. Embodiments of the present disclosure can also be realized by a circuit (e.g., application specific integrated circuit (ASIC) or the like) realizing one or more functions.

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC) or the like) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-123693, filed Jun. 28, 2018, hereby incorporated by reference herein in its entirety.

What is claimed is:

1. An image forming apparatus, comprising:
a storage having a plurality of storage areas; and
a controller configured to perform first processing, in which first confirmation processing is performed and second confirmation processing is not performed, and second processing, in which both the first confirmation processing and the second confirmation processing are performed, the first confirmation processing being processing of confirming whether management information included in a file stored in a storage area of the plurality of storage areas is readable or not, the second confirmation processing being processing of reading all of the plurality of storage areas and leaving an area in which no reading error has occurred and excluding an area in which a reading error has occurred;
wherein the controller makes a reservation for execution of the second processing at a time of initial activation of the image forming apparatus based on reception of an instruction from a user, and wherein the controller makes a reservation automatically for execution of the first processing at a time of initial activation of the image forming apparatus based on occurrence of a reading error of the file stored in the storage area.

2. The image forming apparatus according to claim 1, further including a nonvolatile memory configured to store reserved processing in association with each of the plurality of storage areas,
wherein the controller is further configured to
turn off power supply of the image forming apparatus when the execution of the first processing or the second processing is reserved, and
execute processing based on the reservation read from the nonvolatile memory when the image forming apparatus is initially activated after the power supply is turned on.

3. The image forming apparatus according to claim 1, wherein the controller is further configured to, in a case where the storage area storing the file in which the reading error has occurred has a group relationship with at least one of the plurality of storage areas, reserve execution of the first processing or the second processing for the at least one of the plurality of storage areas.

4. The image forming apparatus according to claim 1, further comprising:
a display configured to display an error notification,
wherein, in a case where the display displays an error notification screen in response to detection of the reading error by the controller, the controller reserves execution of the first processing in a state where the error notification screen is displayed on the display and the image forming apparatus is made unavailable.

5. The image forming apparatus according to claim 4, wherein, in a case where the display does not display the error notification screen in response to detection of the reading error by the controller, the controller reserves execution of the first processing or the second processing in a state where the image forming apparatus is available.

6. The image forming apparatus according to claim 5, wherein, in a case where the controller reserves the execution of the first processing or the second processing, the display displays information for prompting a user to turn off the power supply of the image forming apparatus.

7. The image forming apparatus according to claim 1, wherein, in response to detection of the reading error, in a state where the power supply of the image forming apparatus is kept being turned on, the controller executes second processing on the management information corresponding to the file in which the reading error has occurred.

8. The image forming apparatus according to claim 1, wherein, in a case where the reading error has occurred for a reason that a terminal symbol is not stored at an end point of an address at which the management information is stored, the first confirmation processing is processing in which a terminal symbol is stored at the end point of the address at which the management information is normally stored.

9. A method for controlling an image forming apparatus including a storage having a plurality of storage areas, the method comprising:
performing first processing, in which first confirmation processing is performed and second confirmation processing is not performed, and second processing, in which both the first confirmation processing and the second confirmation processing are performed, the first confirmation processing being processing of confirming whether management information included in a file stored in a storage area of the plurality of storage areas is readable or not, the second confirmation processing being processing of reading all of the plurality of storage areas and leaving an area in which no reading error has occurred and excluding an area in which a reading error has occurred; and
making a reservation for execution of the second processing at a time of initial activation of the image forming apparatus based on reception of an instruction from a user, and making a reservation automatically for execution of the first processing at a time of initial activation of the image forming apparatus based on occurrence of a reading error of the file stored in the storage area.

10. A non-transitory storage medium having a program stored therein, the program causing a computer to execute a method for controlling an image forming apparatus including a storage having a plurality of storage areas, the method comprising:
performing first processing, in which first confirmation processing is performed and second confirmation processing is not performed, and second processing, in which both the first confirmation processing and the second confirmation processing are performed, the first confirmation processing being processing of confirming whether management information included in a file stored in a storage area of the plurality of storage areas is readable or not, the second confirmation processing being processing of reading all of the plurality of storage areas and leaving an area in which no reading error has occurred and excluding an area in which a reading error has occurred; and making a reservation for execution of the second processing at a time of initial activation of the image forming apparatus based on reception of an instruction from a user, and making a reservation automatically for execution of the first processing at a time of initial activation of the image forming apparatus based on occurrence of a reading error of the file stored in the storage area.

\* \* \* \* \*